United States Patent [19]

Glick

[11] Patent Number: 5,507,959

[45] Date of Patent: Apr. 16, 1996

[54] APPARATUS FOR WETTING, FLUSHING AND PERFORMING INTEGRITY CHECKS ON ENCAPSULATED PTFE FILTERS

[75] Inventor: Jeffrey S. Glick, Cupertino, Calif.

[73] Assignee: Advanced Micro Devices, Inc., Sunnyvale, Calif.

[21] Appl. No.: 334,093

[22] Filed: Nov. 4, 1994

[51] Int. Cl.$^6$ .................. B01D 24/46; B01D 65/06; G01M 3/04; G01N 15/08

[52] U.S. Cl. .................. 210/797; 73/38; 73/40; 210/136; 210/321.69; 210/636; 210/500.36

[58] Field of Search .................. 210/99, 136, 321.69, 210/500.21, 636, 194, 409, 500.36, 797; 73/38, 40, 40.7

[56] References Cited

U.S. PATENT DOCUMENTS

| | | | |
|---|---|---|---|
| 4,430,213 | 2/1984 | Ishikawa | 210/136 |
| 4,770,778 | 9/1988 | Yokoyama et al. | 210/500.21 |
| 4,872,974 | 10/1989 | Hirayama et al. | 210/636 |
| 4,874,516 | 10/1989 | Kondo | 210/500.21 |
| 5,353,630 | 10/1994 | Soda' et al. | 73/38 |
| 5,417,101 | 5/1995 | Weich | 73/38 |

FOREIGN PATENT DOCUMENTS 62-144704  6/1987  Japan ................. 210/500.21

Primary Examiner—Joseph W. Drodge
Attorney, Agent, or Firm—Davis Chin

[57] ABSTRACT

A method and apparatus for wetting, flushing and performing integrity checks on encapsulated PTFE filters includes an integral filter housing (112) encapsulating a PTFE filter (114) therein. The filter housing has an inlet pipe (116), a filter outlet pipe (118), and a vent pipe (122). First controllable inlet valve (126) is coupled to the inlet pipe of the filter housing for supplying a solvent solution to pre-wet the encapsulated PTFE filter. A second controllable inlet valve (117) is also coupled to the inlet pipe of the filter housing for supplying gas from a source under pressure to check the integrity of the pre-wetted PTFE filter. A third controllable inlet valve (119) is also coupled to the inlet pipe of the filter housing for supplying a source of water to flush the pre-wetted filter after checking its integrity.

18 Claims, 2 Drawing Sheets

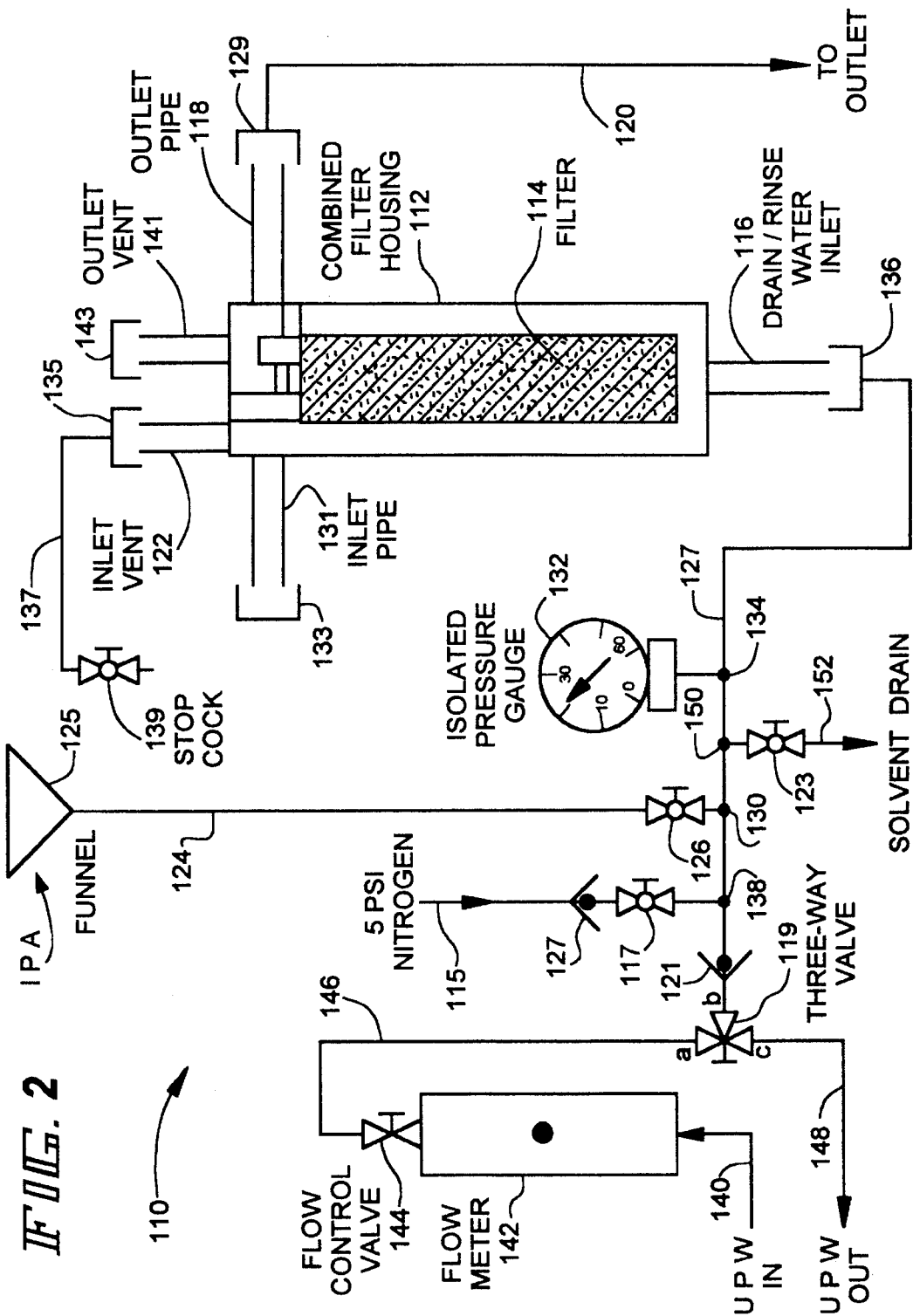

5,507,959

APPARATUS FOR WETTING, FLUSHING AND PERFORMING INTEGRITY CHECKS ON ENCAPSULATED PTFE FILTERS

BACKGROUND OF THE INVENTION

This invention relates generally to filtration systems and more particularly, it relates to a new and improved apparatus for wetting, flushing and performing integrity checks on encapsulated PTFE filters.

As is generally know, microporous membrane cartridge filters such as the Fluorogard ATX-type manufactured and sold by Millipore Corporation of Bedford, Mass., are designed for high flow and high velocity filtration applications and are in widespread use in commercial chemical processing. One of the common uses of these cartridge filters is in wet process cleaning and chemical distribution applications in semiconductor wafer fabrication facilities. These cartridge filters are constructed with a hydrophobic PTFE (polytetrafluroethylene) membrane in a pleated or disk configuration and with PFA (perfluroalkoxy) core, cage and end caps. They function to efficiently remove particles from a broad range of acids, bases, solvents and other aggressive chemicals and thus have compatibility in a wide range of microelectronic process chemical applications. These cartridge filters are typically adapted for use in conjunction with a permanent filter housing so as to serve as a replacement for an existing one therein.

On the other hand, there are also known in the art of disposable-type filters which are formed of a combined PFA housing shell and an encapsulated PTFE filter. These disposable-type filters serve to eliminate the need for handling of hazardous chemicals and minimizes the installation time. These filters are also produced by Millipore Corporation and are referred to as their Chem-Line 1 and Chem-Line 11 filters.

Prior to using either the cartridge filters or disposable-type in filters the chemical processing equipment in the wafer fabrication facilities, it is necessary to pre-wet the membrane of the filters by flowing through or soaking the filter with a typically 60% isopropyl alcohol (IPA) solution in water and subsequently flushing the wetting solution by water. The use of the IPA solution in water is recommended in order to minimize the flammability of the wetting solution. The water flushing serves to remove the IPA solution so as to eliminate the undesirable reaction or contamination of many chemicals with alcohol.

In addition, prior to installation of the filter into the chemical processing equipment, the filter integrity generally needs to be verified. As used herein, the term "integrity" is defined as a condition of being defect free. A number of known methods for non-destructive testing for filter integrity have been employed. Three of these tests are referred to as follows: (1) bubble point test, (2) forward flow test, and (3) pressure hold test. Typically, the testing for filter integrity is performed after the pre-wetting procedure (i.e., after wetting the membrane with the IPA solution) and before the water flushing step.

Perhaps the most frequently used of the filter integrity tests is the "bubble point test." Since the filter membrane is comprised of many small pores, when it is wetted with a liquid, gas at below a certain pressure will not push liquid out of the pores. However, as the pressure is increased above this certain pressure the liquid is forced out of the largest pores of the filter and thus allows the gas to flow therethrough. This certain pressure is referred to as "the bubble point." If this condition occurs below a predetermined minimum pressure value, the filter will be considered to be defective. Nevertheless, this "bubble point test" is not considered to be the most accurate test procedure for large-area cartridge filters. Therefore, "the forward flow test" and the "pressure hold test" are generally the tests which are used. In "the pressure hold test" referred also to as "pressure decay test," the gas pressure is raised to a pre-specified level after the filter has been pre-wetted. If the rate of the pressure decay exceeds certain limits, the filter may be considered defective.

The prior art device for wetting and flushing a cartridge filter is illustrated in FIG. 1 and has been labeled "Prior Art." The device 10 includes a filter housing 12 which is used to contain a filter cartridge 14 to be wetted and flushed. The filter housing is provided with an inlet pipe 16 connected to its one side and an outlet standpipe 18 connected to its outlet connection. The top of the filter housing is provided with a vent valve 20 which is connected with a vent pipe 22.

A solvent solution such as isopropyl alcohol (IPA) is fed into a solution inlet pipe 24 and through to an IPA valve 26. The solution valve is opened and closed so as to allow the solvent solution to fill the interior of the filter housing. A pressure gauge 28 is connected downstream of the valve 26 and to the inlet pipe 16 so as to permit monitoring of the pressure in the inlet pipe 16. Further, ultra-purified water (UPW) is fed to a UPW inlet pipe 30 which is connected to one side of a UPW valve 32. The other side of the valve 32 is connected to a communicating pipe 34 via a flow meter 36. The communicating pipe 34 is connected upstream of the IPA valve 26 and also to the inlet pipe 16.

In operation, the UPW valve 32 and the IPA valve 26 are both initially closed. The filter cartridge that is to be wetted and flushed is inserted into the filter housing 12. Next, the vent valve 20 is opened. Then, the IPA valve 26 is opened and the IPA solution is introduced into the solution inlet pipe 24 until the interior of the filter housing 12 is completely filled. When the IPA solution reaches the top of the vent pipe 22, the filter housing 12 is tipped slightly so as to insure that all of the air has been removed therefrom. The vent valve 20 is then closed. More IPA solution is added to the solution inlet pipe 24 until the level of the IPA solution has reached inside of the filter core and flows out the top of the standpipe 18. The filter cartridge 14 is allowed to soak in the IPA solution for the amount of time recommended by the manufacturer (i.e., approximately 30 minutes).

After the filter cartridge 14 has been pre-wetted, it must be flushed with the UPW before installation in the chemical processing equipment. Prior to flushing, the standpipe 18 is turned sideways and the vent valve 20 is opened, the IPA solution is allowed to drain from the filter housing 12. The vent valve 20 remains open. This flushing step is first accomplished by opening the UPW inlet valve 32 so as to permit the delivery of the UPW at the rate of approximately 2 GPM into the filter housing 12 with the IPA valve 26 opened and the vent valve 20 open to flush all the IPA solution from these two valves. Next, the vent valve 20 and the IPA valve 26 are closed and the UPW is continued to flow into and through the filter housing 12 in order to insure that the IPA solution has been purged. Finally, the UPW is drained from the housing 12 and the filter cartridge 14 is removed.

This prior art device as just described has the disadvantages of being incapable of recirculating the UPW or to remove the same UPW from the device when it is not in use. Since the filter cartridge 14 engages the bottom interior surface of the filter housing 12, there is also created the problem of trapping air in the downstream side of the cartridge. Further, this prior art device suffers from the fact that draining of the filter housing 12 is inefficient and time-consuming. In addition, this device is not able to accommodate encapsulated disposable filters and makes no provision for performing of the integrity test on the filter cartridge.

SUMMARY OF THE INVENTION

Accordingly, it is a general object of the present invention to provide a new and improved apparatus for wetting, flushing and performing integrity checks on encapsulated PTFE filters which solves all of the aforementioned problems, but yet is relatively simple and economical to manufacture and assemble.

In a preferred embodiment of the present invention, there is provided an improved apparatus for wetting, flushing and performing integrity checks on encapsulated PTFE filters which includes an integral filter housing encapsulating a PTFE filter therein. The filter housing has an inlet pipe, filter outlet pipe, and a vent pipe. A first controllable inlet is coupled to the inlet pipe of the filter housing and supplies a solvent solution to pre-wet the encapsulated PTFE filter. A second controllable inlet is also coupled to the inlet pipe of the filter housing and supplies a source of gas under pressure to check the integrity of the pre-wetted PTFE filter. A third controllable inlet is also coupled to the inlet pipe of the filter housing and supplies a source of water to flush the pre-wetted filter after checking its integrity.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 2 is a schematic diagram of an apparatus for wetting, flushing and performing integrity checks on encapsulated PTFE filters, constructed in accordance with the principles of the present invention.

DESCRIPTION OF THE PREFERRED EMBODIMENT

Figure 1:
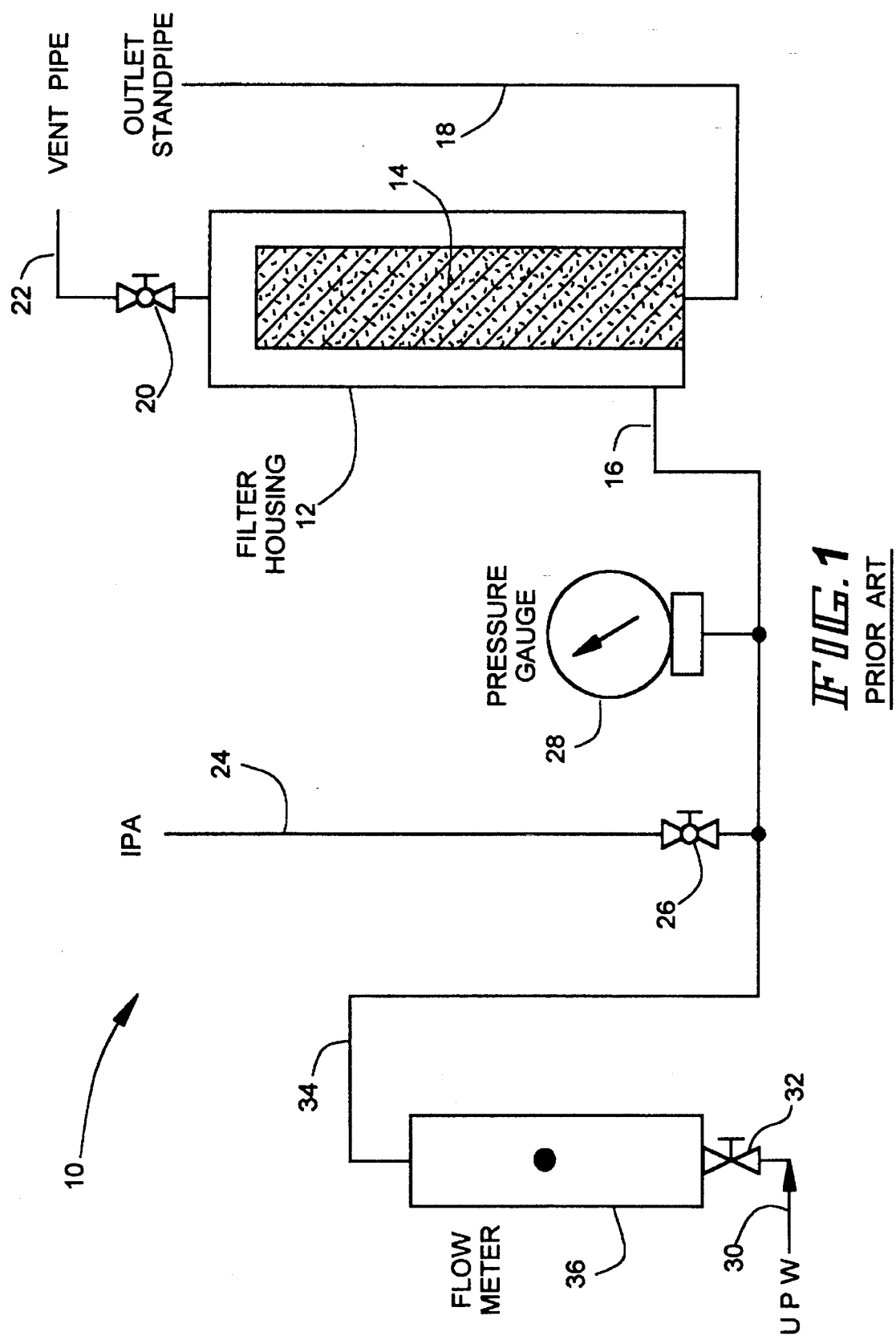
FIG. 1 is a schematic diagram of a prior art device for wetting and flushing a filter cartridge.

Referring now to FIG. 2 of the drawings, there is shown a schematic diagram of a method and apparatus 110 for wetting, flushing and performing integrity checks on PTFE encapsulated filters, constructed in accordance with the principles of the present invention. The apparatus 110 includes an integral or combined filter housing 112 which has encapsulated therein a disposable-type PTFE filter 114. The PTFE filter may be of the type similar to those commercially available from Millipore Corporation. The filter is to be wetted with a solvent solution such as isopropyl alcohol (IPA) and then flushed or rinsed with ultra-purified water (UPW). However, unlike the prior art of FIG. 1, after wetting with the IPA solution and before flushing with the UPW, the present invention is also used to perform an integrity check on the filter 114.

This integrity check is accomplished by the addition of a regulated filter source (not shown) of nitrogen ($N_2$) through a nitrogen inlet pipe 115 which is fed via nitrogen valve 117 for supplying the nitrogen gas under pressure to the filter housing 112 containing the filter 14. Preferably, the pressure of the nitrogen is regulated to be approximately 5 psi. Further, the three-way valve 119 is provided so as to allow switching between a recirculation mode and a flushing mode. As a consequence, the UPW can now be recirculated when the apparatus is in standby (i.e., when the apparatus is not being used to flush the filter). A first check valve 121 has been connected to the three-way valve 119 and a second check valve 127 has been connected to the nitrogen inlet pipe 115 in order to protect the UPW and nitrogen sources from potential contamination from the other fluids and gas used in the apparatus. In addition, the solvent drain valve 123 has been connected to the inlet pipe of the filter housing so as to facilitate its draining.

As can be seen, the filter housing 112 is installed in a vertical orientation and has a filter (drain/rinse water) inlet pipe 116 connected to its bottom and a filter outlet pipe 118 connected to one side of its upper end. A drain line 120 is connected to the filter outlet pipe via a connecting fitting 129 which is provided for connecting the drain line 120 to the filter outlet pipe 118. A main inlet pipe 131 is connected to the other side at its upper end, and is closed by capped fitting 133. The top end of the filter housing 112 is also provided with an inlet vent pipe 122 which is connected to the atmosphere via a connecting fitting 135, a vent line 137 and a stopcock 139. An outlet vent pipe 141 is also provided at the top of the filter housing which is closed by a capped fitting 143.

A solvent solution preferably consisting of 50%–100% isopropyl alcohol (IPA) in water is fed into the solution inlet pipe 124 via a funnel 125 and through an IPA solution valve 126. The funnel 125 is positioned at an elevation higher than all other components of the system. The solution valve 126 is opened and closed so as to allow the solvent solution to fill the interior of the filter housing 112. One side of the solution valve 126 is connected to the solution inlet pipe 124, and the other side of the solution valve is connected to a main manifold 128 via a connecting joint 130. A pressure gauge 132 is connected downstream of the solvent drain valve 123 and is also connected to the main manifold 128 at a connecting joint 134. The pressure gauge 132 allows for the monitoring of the pressure in the filter housing 112. It will be noted that the inlet pipe 116 is connected to the main manifold 128 via the connecting fitting 136.

The nitrogen inlet pipe 115 is connected to one side of the nitrogen valve 117 via the second check valve 127. The other side of the nitrogen valve is also connected to the main manifold 128 at a connecting joint 138. The first check valve 121 has its one end connected to the main manifold 128 at the same connecting joint 138 and has its other end connected to a first outlet side b (normally closed) of the three-way valve 19. Ultra-purified water (UPW) is fed to an UPW inlet pipe 140 which is connected to one side of a flow meter 142. A regulated flow control valve 144 has its one side connected to the other side of the flow meter 142. The other side of the control valve 144 is joined to one end of a water communicating pipe 146 whose other end is joined to the common input side a of the three-way valve 119. The second outlet side c (normally open) of the three-way valve 119 is connected to an UPW outlet pipe 148.

The solvent drain valve 123 has its one side connected to the main manifold 128 at a connecting joint 150. The other side of the drain valve 123 is connected to a solvent drain line 152. The drain valve 123 is opened and closed so as to facilitate draining of the solvent solution from the main manifold 128.

In operation, the nitrogen valve 117 and the solvent drain valve 123 are all initially closed as well as the stopcock 139. Further, the three-way valve 119 is turned so that the common inlet side a is in fluid communication with the second outlet side c so as to permit recirculation of the UPW during standby. The regulated flow control valve 144 is initially adjusted so that a UPW flow of approximately 2 GPM is observed on the flow meter 142. Thereafter, the control valve 144 is not further adjusted and is allowed to remain flowing even in the standby mode. With the filter housing 112 oriented vertically and connected as illustrated, the vent stopcock 139 is opened. It will be noted that the disposable-type PTFE filter is encapsulated by the housing 112 so as to provide safety and convenience during its use. Further, the labor costs and time required for installation and assembly are substantially reduced over the filter cartridge disposed within a separate housing.

Next, the IPA valve 126 is opened, and the IPA solution of preferably 60% is introduced or poured into the funnel 125 in order to fill the interior of the housing 112. This is continued until the 60% IPA solution reaches the end of the vent pipe 139a. The vent stopcock 139 is now closed. Thereafter, the IPA solution is continued to be added until the level of the IPA solution has flooded the inside of the filter core and begins to flow out of the drain line 120. Finally, the apparatus is allowed to stand or soak per the manufacturer's recommended time such as approximately thirty minutes, in order to permit soaking of the filter in the IPA solution. This completes the pre-wetting procedure for the filter.

Unlike the device of FIG. 1, an integrity test (pressure hold test) will now be performed on the filter after the pre-wetting process and before the flushing or rinsing of the filter with the ultra-purified water. It should be understood that prior to the integrity test, the IPA solution is allowed to totally drain from the filter housing by opening the vent stopcock 139, the IPA valve 126, and the solution drain valve 123. Thereafter, the drain valve 123 and the IPA valve 126 are closed.

This integrity test is accomplished first by closing all of the valves including the stopcock 139. Next, the nitrogen valve 117 is opened so as to allow the regulated source of nitrogen ($N_2$) to enter the inlet pipe 115 at a pressure of approximately 5 psi. This pressure of 5 psi is selected to be slightly below the "bubble point" of the filter membrane. After the valve 117 is turned off, the reading on the pressure gauge 132 is observed. If the pressure holds constant for a predetermined time, then the filter is considered to have passed the "pressure hold" test. If there is a substantial loss of pressure, this is an indication of the failure of the integrity test (i.e., a leakage area), and thus the pre-wetting procedure must be repeated. If the filter does not eventually pass the integrity test, the filter must be rejected and not be used for chemical filtering. After the integrity test is completed, the vent stopcock 139 is opened so as to relieve the pressure inside of the filter housing 112.

After the integrity test on the pre-wetted filter and before its installation in the chemical processing equipment, the filter must be flushed or rinsed with the ultra-purified water. This flushing serves to remove all of the IPA solution, which would act as a contaminant for the filtered chemical in the filter's ultimate application. It should be noted that the filter must not remain drained for longer than 10 minutes since it may begin to dry and thus will not be completely wetted. This flushing procedure is accomplished by initially opening the stopcock 139 so that the nitrogen may be displaced by UPW during the rinse procedure.

Next, the three-way valve 119 is turned so that the UPW is then passed from the inlet side a of the three-way valve 119 to its first outlet side b, through the check valve 121, and into the main manifold 128. Thereafter, the UPW enters the filter housing via the inlet pipe 116. This water is allowed to flow through the filter until a minimum predetermined volume has passed (i.e., between 50–100 gallons at a flow rate of 2.0 GPM). Some of the water is allowed to flow out through the vent pipe 139a and the outlet drain line 120 in order to insure that the IPA solution has been completely purged. After this flushing procedure, the combined filter housing 112 is removed from the manifold by removing the various fittings. Thereafter, all of the valves are turned off and the main manifold 128 is purged with the pressure ($N_2$) source by turning on the nitrogen valve 117.

It should be understood that the pressure gauge 132, three-way valve 119, solvent valve 126, nitrogen valve 117, solvent drain valve 123, check valves 121 and 127, and stopcock 139 illustrated in FIG. 2 of the present invention are conventional components and may be of the type similar to those commercially available from Fluroware, Inc. of Chaska, Minn. Similarly, the flow meter 142 with the flow control valve 144 is also quite standard in the industry and is preferably of the type that is manufactured and sold by Future Star Corporation of Edina, Minn.

From the foregoing detailed description, it can thus be seen that the present invention provides an improved method and apparatus for wetting, flushing and performing integrity checks on encapsulated PTFE filters. The apparatus includes a first controllable inlet for supplying a solvent solution to pre-wet the encapsulated PTFE filter. A second controllable inlet is provided for supplying a source of gas under pressure to check the integrity of the pre-wetted PTFE filter. The third controllable inlet is used to supply a source of water to flush the pre-wetted filter after checking its integrity.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. An apparatus for pre-wetting, flushing and performing integrity checks on encapsulated PTFE filters, said apparatus comprising:

an integral filter housing (112) encapsulating a PTFE filter (114) therein, said filter housing having an inlet pipe (116), a filter outlet pipe (118), and a vent pipe (122);

first controllable inlet valve (126) coupled to said inlet pipe of said filter housing for supplying a solvent solution to pre-wet said encapsulated PTFE filter;

second controllable inlet valve (117) coupled also to said inlet pipe of said filter housing for supplying gas from a source of gas under pressure to check the integrity of said pre-wetted PTFE filter;

third controllable inlet (119) means coupled also to said inlet pipe of said filter housing for supplying water from a source a source of water to flush said pre-wetted filter after checking its integrity; and said third controllable inlet valve including a water inlet pipe (140) connected to a source of water and a three-way valve (119) upstream of means coupling the second inlet valve with the inlet pipe of the filter housing having its inlet side coupled to the water inlet pipe, its first outlet side coupled to said inlet pipe of said filter housing, and its second outlet side connected to a water outlet pipe (148), said inlet side of said three-way valve being in fluid communication with said second outlet side so as to permit recirculation of the water during a standby mode of operation, said inlet side of said three-way valve being in fluid communication with said second outlet side so as to rinse the filter during a flushing mode of operation.

2. An apparatus as claimed in claim 1, wherein said first controllable inlet valve includes a solvent inlet pipe (124) connected to receive the solvent solution and a solvent valve (126) which is openable to deliver the solvent solution to said filter housing.

3. An apparatus as claimed in claim 2, wherein said second controllable inlet valve includes a gas inlet pipe (115) connected to receive gas from the source of gas under pressure and a gas valve (117) which is openable so as to deliver gas to said filter housing.

4. An apparatus as claimed in claim 1, wherein said solvent solution is comprised of isopropyl alcohol.

5. An apparatus as claimed in claim 1, wherein said solvent solution consists of approximately 50%–100% isopropyl alcohol.

6. An apparatus as claimed in claim 1, wherein said pressurized gas is nitrogen at approximately 5 psi.

7. An apparatus as claimed in claim 1, wherein said water source contains ultra-purified water.

8. An apparatus as claimed in claim 1, further comprising a solvent drain valve (123) coupled to said inlet pipe of said filter housing which is openable to facilitate draining of the solvent solution after said PTFE filter has been pre-wetted.

9. An apparatus as claimed in claim 1, further comprising first and second check valves (121, 127) interconnected between said source of water and said source of gas so as to prevent the flow of gas or solvent into the source of water, and to prevent the flow of water or solvent into the source of gas.

10. A method for wetting, flushing and performing integrity checks on encapsulated PTFE filters, comprising the steps of:
pre-wetting an encapsulated PTFE filter with a solvent solution;
checking the integrity of the pre-wetted PTFE filter with gas from a source of gas under pressure;
flushing said pre-wetted filter after checking its integrity with water from a source of water during a flushing mode of operation; and
recirculating the water from a water inlet pipe to a water outlet pipe during a standby mode of operation upstream of means coupling the source of gas with the filter.

11. A method as claimed in claim 10, wherein said pre-wetting step includes using a solvent inlet pipe connected to receive the solvent solution and a solvent valve which is openable to deliver the solvent solution to said filter.

12. A method as claimed in claim 11, wherein said checking step includes using a gas inlet pipe connected to receive gas from the source of gas under pressure and a gas valve which is openable so as to deliver gas to said filter.

13. A method as claimed in claim 10, wherein said solvent solution is comprised of isopropyl alcohol.

14. A method as claimed in claim 10, wherein said solvent solution consists of approximately 50%–100% isopropyl alcohol.

15. A method as claimed in claim 10, wherein said pressurized gas is nitrogen at approximately 5 psi.

16. A method as claimed in claim 10, wherein said water source contains ultra-purified water.

17. A method as claimed in claim 10, further comprising the step of opening a solvent drain valve coupled to an inlet pipe of said filter so as to facilitate draining of the solvent solution after said PTFE filter has been pre-wetted.

18. A method as claimed in claim 10, further comprising the step of connecting first and second check valves between said source of water and said source of gas so as to prevent the flow of gas or solvent into the source of water and to prevent the flow of water or solvent into the source of gas.

* * * * *

UNITED STATES PATENT AND TRADEMARK OFFICE
CERTIFICATE OF CORRECTION

PATENT NO. : 5,507,959
DATED : April 16, 1996
INVENTOR(S) : Jeffry S. Glick

It is certified that error appears in the above-indentified patent and that said Letters Patent is hereby corrected as shown below:

Column 6, line 66 (Claim 1), cancel "a source" (first occurrence only).

Column 7, line 13 (Claim 1), change "second" to --first--.

In the drawings:
In Figure 2 of the drawings (sheet 2), change reference numeral "127" above and to the right of reference numeral "134" to -- 128 --; below the symbol for the "stop cock 139," add a reference numeral -- 139a (with a lead line) --

Signed and Sealed this

Sixth Day of August, 1996

*Attest:*

BRUCE LEHMAN

*Attesting Officer*     *Commissioner of Patents and Trademarks*